(12) United States Patent
Routhier et al.

(10) Patent No.: US 9,313,475 B2
(45) Date of Patent: Apr. 12, 2016

(54) PROCESSING 3D IMAGE SEQUENCES (71) Applicant: THOMSON LICENSING, Issy de Moulineaux (FR)

(72) Inventors: Pierre Hughes Routhier, Varennes (CA); William Gibbens Redmann, Glendale (CA); Didier Doyen, La Bouexiere (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/368,558

(22) PCT Filed: Dec. 20, 2012

(86) PCT No.: PCT/IB2012/002927
§ 371 (c)(1),
(2) Date: Jun. 25, 2014

(87) PCT Pub. No.: WO2013/102790
PCT Pub. Date: Jul. 11, 2013

(65) Prior Publication Data
US 2015/0071525 A1 Mar. 12, 2015

Related U.S. Application Data (60) Provisional application No. 61/583,105, filed on Jan. 4, 2012, provisional application No. 61/583,462, filed on Jan. 5, 2012, provisional application No. 61/584,123, filed on Jan. 6, 2012.

(51) Int. Cl.
*G06K 9/00* (2006.01)
*H04N 13/00* (2006.01)
*G06T 7/00* (2006.01)

(52) U.S. Cl.
CPC .......... *H04N 13/0022* (2013.01); *G06T 7/0075* (2013.01); *H04N 13/0033* (2013.01); *G06T 2207/10021* (2013.01); *H04N 2213/002* (2013.01)

(58) Field of Classification Search
CPC .................. H04N 13/0022; G06T 7/0075
USPC ........................................... 382/154
See application file for complete search history.

(56) References Cited

U.S. PATENT DOCUMENTS 5,872,590 A  2/1999  Aritake et al.
6,304,286 B1  10/2001  Shirai et al.
(Continued)

FOREIGN PATENT DOCUMENTS

JP  2011160302  8/2011
KR  2009102688  9/2009
(Continued)

OTHER PUBLICATIONS

Park et al., "Real-Time Stereoscopic Conversion with Adaptable Viewing Distance at personal Stereoscopic Viewing Devices", LNCS 4557, HCII 2007, pp. 738-746.
(Continued)

*Primary Examiner* — John Strege
(74) *Attorney, Agent, or Firm* — Robert D. Shedd; Xiaoan Lu

(57) ABSTRACT

Various implementations provide techniques to prevent excessive parallax, depth, or disparity from being passed through to a viewer. In one particular implementation, it is determined that a depth indicator for an object in a stereoscopic image pair of a video sequence is outside of a target range. One or more images of the stereoscopic image pair is modified so that the depth indicator for the object is within the target range. In other implementations, a depth transition between the object and another portion of the video sequence is smoothed. In further implementations, the stereoscopic image pair is replaced with a 2D image pair that includes the object. In yet further implementations, a resulting video sequence includes (i) one or more stereoscopic image pairs having non-zero disparity and for which the depth indicator is within the target range for the entire image pair, and (ii) one or more 2D image pairs.

22 Claims, 4 Drawing Sheets

(56) References Cited

U.S. PATENT DOCUMENTS

| | | |
|---|---|---|
| 7,889,196 B2 * | 2/2011 | Nomura et al. ............... 345/419 |
| 8,044,997 B2 * | 10/2011 | Masuda et al. ................. 348/51 |
| 8,045,792 B2 | 10/2011 | Koo et al. |
| 8,384,763 B2 | 2/2013 | Tam |
| 8,787,654 B2 | 7/2014 | Zhang et al. |
| 2004/0240725 A1 | 12/2004 | Xu et al. |
| 2005/0019018 A1 | 1/2005 | Kim et al. |
| 2005/0190180 A1 | 9/2005 | Jin et al. |
| 2005/0219239 A1 | 10/2005 | Mashitani et al. |
| 2006/0152579 A1 | 7/2006 | Utsugi et al. |
| 2007/0024614 A1 | 2/2007 | Tam |
| 2008/0112616 A1 | 5/2008 | Koo et al. |
| 2008/0150945 A1 * | 6/2008 | Wang et al. ................... 345/427 |
| 2008/0218612 A1 | 9/2008 | Border et al. |
| 2008/0240549 A1 | 10/2008 | Koo et al. |
| 2009/0040295 A1 * | 2/2009 | Koo et al. ....................... 348/42 |
| 2009/0153652 A1 | 6/2009 | Barenbrug |
| 2009/0160931 A1 | 6/2009 | Pockett et al. |
| 2009/0207235 A1 | 8/2009 | Francini et al. |
| 2009/0244269 A1 | 10/2009 | Watanabe et al. |
| 2009/0279741 A1 | 11/2009 | Susca et al. |
| 2009/0282429 A1 | 11/2009 | Olsson et al. |
| 2011/0032341 A1 | 2/2011 | Ignatov et al. |
| 2011/0081042 A1 | 4/2011 | Kim et al. |
| 2011/0109731 A1 | 5/2011 | Koo et al. |
| 2011/0142309 A1 * | 6/2011 | Zhang et al. .................. 382/128 |
| 2011/0255775 A1 * | 10/2011 | McNamer et al. ............ 382/154 |
| 2011/0261160 A1 * | 10/2011 | Tadokoro et al. ............... 348/46 |
| 2011/0310982 A1 * | 12/2011 | Yang et al. ............... 375/240.26 |
| 2012/0007964 A1 * | 1/2012 | Morisada et al. ............... 348/54 |
| 2012/0055892 A1 | 3/2012 | Hardy |
| 2012/0082368 A1 * | 4/2012 | Hirai et al. .................... 382/154 |
| 2012/0105611 A1 * | 5/2012 | Godar ............................. 348/54 |
| 2012/0274747 A1 * | 11/2012 | Yasuda ............................ 348/51 |
| 2013/0162641 A1 * | 6/2013 | Zhang et al. .................. 345/419 |

FOREIGN PATENT DOCUMENTS

| | | |
|---|---|---|
| WO | WO2005009052 | 1/2005 |
| WO | WO2009139740 | 11/2009 |
| WO | WO2011081646 | 7/2011 |
| WO | WO2012055892 | 5/2012 |
| WO | WO2012156489 | 11/2012 |

OTHER PUBLICATIONS

Bediz et al., "View Point Tracking fs for 3D Display Systems", Middle East Technical University, Ankara, Turkey, 2005.

Lang et al., "Nonlinear Disparity Mapping for Stereoscopic 3D," ACM Transactions on Graphics in 2010 (Proc. SIGGRAPH), vol. 29, No. 3, 10 pages.

Campisi et al., "Stereoscopic Images Quality Assessment," Copyright 2007 EURASIP, EUSIPCO, Poznan 2007. pp. 2110-2114.

Sun et al., "Evaluating Methods for Controlling Depth Perception in Stereoscopic Cinematography," Proc. SPIE—IS & T Electronic Imaging, vol. 7237, 2009, 12 pages.

Benoit et al., "Using Disparity for Quality Assessment of Stereoscopic Images," IEEE Int'l. Conference on Image Processing (ICIP 2008), San Diego, US, Version 1—Sep. 23, 2008, 4 pages.

Hoffman et al., "Vergence-accommodation Conflicts Hinder Visual Performance and Cause Visual Fatigue," Journal of Vision (2008) 8(3):33, published Mar. 28, 2008, pp. 1-30.

Yano et al., "Two Factors in Visual Fatigue Caused by Stereoscopic HDTV Images," Elsevier B.V., Displays 25, available online Oct. 19, 2004, pp. 141-150.

Li et al., "A Hybrid Camera for Motion Deblurring and Depth Map Super-Resolution," IEEE Conference on Computer Vision and Pattern Recognition, 2008 (CVPR 2008), Jun. 23, 2008, pp. 1-8.

Kim et al., "Depth Adjustment for Stereoscopic Image Using Visual Fatigue Prediction and Depth-Based View Synthesis", 2010 IEEE International Conference on Multimedia and Expo (ICME), Jul. 23, 2010, pp. 956-961.

* cited by examiner

PROCESSING 3D IMAGE SEQUENCES

CROSS REFERENCE TO RELATED APPLICATIONS

This application claims the benefit, under 35 U.S.C. §365 of International Application PCT/FR2012/053034, filed Dec. 20, 2012, which was published in accordance with PCT Article 21(2) on Jul. 11, 2013 in English and which claims the benefit of U.S. provisional patent application Nos. 61/583,105, filed Jan. 4, 2012; 61/583,462, filed Jan. 5, 2012 and 61/584,123, filed Jan. 6, 2012.

TECHNICAL FIELD

Implementations are described that relate to stereoscopic video sequences. Various particular implementations relate to adjusting parallax, depth, or disparity in one or more image pairs of a stereoscopic video sequence.

BACKGROUND

Current stereoscopic content can be classified in two categories: content that is pre-rendered, meaning that the parallax values are built into the stereo images, and content that is rendered in real time, like computer-generated games and movies. In the case of content that is rendered in real time, it is possible to limit the amount of parallax through limitations on the rendering engine. However, it is more difficult to provide a solution for pre-rendered content, such that a viewer is protected if pre-rendered content violates comfortable thresholds.

SUMMARY

According to a general aspect, it is determined that a depth indicator for an object in a stereoscopic image pair of a video sequence is outside of a target range. One or more images of the stereoscopic image pair is modified so that the depth indicator for the object is within the target range.

According to another general aspect, a depth transition between the object and another portion of the video sequence is smoothed.

According to another general aspect, modifying one or more images of the stereoscopic image pair includes replacing the stereoscopic image pair with a 2D image pair that includes the object.

According to another general aspect, replacing the stereoscopic image pair with the 2D image pair results in a video sequence that includes (i) one or more stereoscopic image pairs having non-zero disparity and for which the depth indicator is within the target range for the entire image pair, and (ii) one or more 2D image pairs.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 5 provides a flow diagram depicting an implementation of a process for smoothing a depth transition.

DETAILED DESCRIPTION

Many mobile audio devices provide volume safety cutoffs, in order to prevent damaging effects on a user's hearing due to excessively loud source content. In stereoscopic viewing, there appears to be no directly analogous device, and, as a result, the viewer is not protected from the uncomfortable experience of viewing excessive parallax. One or more implementations provide a mechanism to limit excessive parallax from being viewed. One or more implementations also provide the possibility to modulate depth, to compress depth, or to transition into 2D on a content shot with excessive parallax, in order to bring all of the content back to a comfortable level for the user.

Parallax, disparity, and depth are related in stereoscopic presentations. Parallax is the angular difference between two sight-lines to an object. In the context of stereoscopic presentation, the sight-lines originate at each of a viewer's left- and right-eyes and proceed to corresponding left- and right-eye image views of the object (or portion thereof).

Disparity is the linear difference in the positions of an object (or portion thereof) in each of the left- and right-eye images of a stereoscopic image pair. Disparity may be expressed as a physical measure (e.g., in centimeters), or in an image-relative measure, (e.g., in pixels or as a percentage of image width). A conversion between the two forms is possible when the size of the images as displayed is known.

Depth, as perceived in a stereoscopic presentation, can be determined from parallax. However, depth is trigonometrically, not linearly, related to disparity and parallax. Depth is shown by the apparent distance (D) in FIG. 1, as discussed below, and can in theory range from zero to infinity.

The three measures of parallax, disparity, and depth are, as previously explained, mutually derivable. All three are considered to be measures of "depth", in a broad sense, and are treated in this application as "depth indicators". These three measures are considered to be interchangeable for purposes of this application, unless otherwise required. We provide the following brief examples of how these three measures correspond in Table 1 below.

TABLE 1

| PARALLAX | DISPARITY | DEPTH |
|---|---|---|
| 0 | Positive Interocular Distance | Infinity |
| P1, which is >0 and determined by (i) distance to the screen and (ii) interocular distance | 0 | Distance to the Screen |
| P2, which is > P1 | <0 | <Distance to the Screen |

Figure 1:
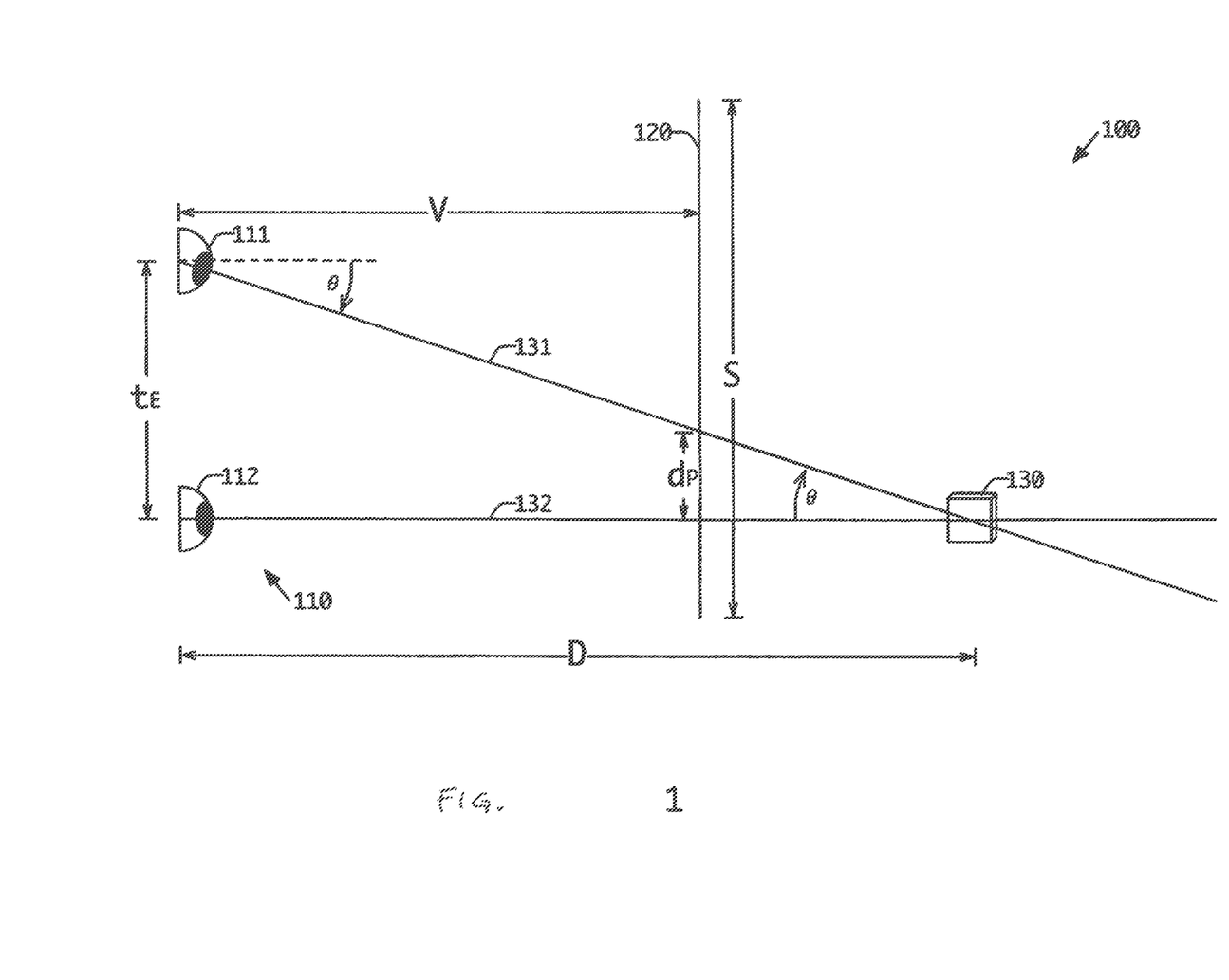
FIG. 1 provides a pictorial diagram depicting a particular parallax situation.

FIG. 1 shows a situation 100 where a viewer 110 is watching a stereoscopic presentation on screen 120 and perceives a particular object 130 whose apparent distance (D) from the viewer results from parallax (θ), which is induced by the combination of physical disparity ($d_P$), viewing distance (V), and the viewer's interocular spacing ($t_E$).

For simplicity of explanation and illustration, situation 100 is shown with left and right sightlines 131, 132 forming a right triangle with a line between the viewer's left and right eyes 111, 112, the line having a length of ($t_E$). Further, and again for simplicity, that line is considered to be parallel to the screen 120.

In the example situation 100, the physical disparity ($d_P$) is by some conventions, and herein, considered negative, and is negative whenever the left-eye image of the object is to the left of the right-eye image of the object.

The parallax angle (θ), in situation 100, is positive, and is positive for all values of ($d_P$) greater than ($-t_E$). Parallax (θ) will be zero (not illustrated in FIG. 1) when the sight-lines 131 and 132 are parallel, in which case object 130 would appear to be at an infinite distance (D=∞). This would be the case if the physical disparity ($d_P$) of the object, as displayed on screen 120, were negative and equal in magnitude to the viewer's interocular distance, (that is, $d_P$ is equal to $-t_E$).

There are cases where the parallax (θ) can be displayed, by presenting a stereoscopic image pair where the left- and right-eye images of object 130 have a disparity of less than ($-t_E$). In these circumstances, the parallax becomes negative, at which point the presentation of object 130 by screen 120 ceases to correspond to have a meaningful interpretation and the parallax (θ) becomes negative. In such a case, geometrically, the sightlines 131, 132 would intersect behind viewer 110, but the images of object 130 still appear on screen 120—producing a contradiction that the human visual system does not enjoy.

So long as the physical disparity is at least ($-t_E$), corresponding to a parallax (θ) of at least zero, when the parallax becomes more positive, that is, the left eye turns further to the right and/or the right eye turns further to the left when viewing the object 130, the object appears to come closer to the viewer. As the parallax becomes less positive, the object 130 appears further away. In the case where disparity is zero, the object appears to reside at the same distance from the viewer as the screen (D=V).

The relationship between interocular spacing ($t_E$), distance V from the viewer to a screen, physical disparity ($d_P$), and an object's apparent distance (D) from the viewer can be described in an equation obtained by inspecting the similar triangles of FIG. 1 (and recalling that the sign of $d_P$ in situation 100 is negative):

$$d_P=-t_E(D-V)/D \qquad \text{EQ. 1:}$$

Which, solved for D, gives:

$$D=t_E V/(d_P+t_E) \qquad \text{EQ. 2:}$$

Recall that in the convention from above, that positive physical disparity $d_P$ places the left-eye image of an object rightward of the corresponding right-eye image of the object. As a result, five interesting conditions occur with EQ. 2:

1. When $d_P$ is positive, then ($d_P+t_E$) is greater than $t_E$, and D will be less than V. That is, an object displayed with positive physical disparity $d_P$ will appear to be closer to the viewer than the screen. For example, if $t_E=d_P$, D will equal V/2, and result in the object appearing halfway between the viewer and the screen.
2. If $d_P$ is zero, then D will equal V. That is, an object with zero disparity will appear at the screen.
3. When $d_P$ is negative, but of smaller magnitude than $t_E$, as shown in situation 100, then D will be greater than V. That is, an object will appear behind the screen.
4. If $d_P$ is equal to $-t_E$, then the object will appear at infinity.

5. If $d_P$ is more negative than $t_E$, then the contradiction mentioned above in conjunction with negative parallax occurs. That is, EQ. 1 indicates that D is negative, which suggests that the object appears behind the viewer, even as the images of the object appear in front of the view on screen 120. Because humans do not see objects behind them, such a presentation can result in a perceptual conflict that should typically be avoided.

Physical disparity ($d_P$) is proportional to the disparity ($d_i$) intrinsic to the images of a stereoscopic image pair and the size of the screen (S). As the size (S) of the screen grows larger (and with it the size of the stereoscopic images), a particular intrinsic disparity ($d_i$) will produce a larger physical disparity (dP):

$$d_P=d_i\times S \qquad \text{EQ. 3:}$$

Where $d_i$ is expressed as a fraction of image width. Combining this with EQ. 1 yields:

$$D=t_E V/(d_i\times S+t_E) \qquad \text{EQ. 4:}$$

Thus, for a particular stereoscopic image pair showing an object with an intrinsic disparity ($d_i$), the apparent distance (D) of the object from the viewer is altered by varying the viewer's distance from the screen (V) and/or size of the screen (S). Additionally, while interocular spacing ($t_E$) is essentially constant for an individual over long spans of time, individuals within a population may differ substantially, especially if comparing adults to children.

From the above discussion and equations, it should be clear (i) that all of these measures can be calculated from the others, and (ii) how parallax, disparity, and apparent distance are all interrelated. In some embodiments, these equations may be employed using predetermined 'default' values for certain elements, for example interocular distance ($t_E$), screen size (S), and/or viewing distance (V), so that other values (e.g., distance D) may be presented in a contingent fashion, where final values might depend upon how actual values differ from the default assumptions.

It is useful to note that the discussion of parallax with respect to FIG. 1 is an approximation. The calculations are made easier, and the number of variables made fewer, by assuming that one sight line is perpendicular. The perpendicular sight line results in a right angle at the right eye 112 between the sight line and the interocular spacing $t_E$. It is a further approximation to assume that the head is facing the screen, which results in the baseline of the eyes and the plane of the screen being parallel (i.e., the eyes are equidistant from the screen). The head facing the screen squarely is typically a good assumption, because that would be the center case when considering what might go wrong in a viewing situation. As such, any head turning could result in a deviation in either direction, with square-facing being the median condition. When $t_E$ is small compared to V, i.e., theta is small, the approximation is generally considered acceptable because both sin( ) and tan( ) are typically considered to be fairly linear in that region.

The three measures being discussed each have advantages. Parallax is typically considered to be closest to how the human brain actually perceives 3D. Depth is typically considered to be most descriptive of an actual scene. Disparity exactly describes what is happening at the screen. Many variables, such as, for example, a head rotating, a viewer moving closer to or further from a screen, or a screen size changing, can affect depth and parallax, but do not impact disparity (at least not disparity as a proportion of the image size). It should also be clear that disparity can be directly controlled and modified.

Note that many implementations discussed in this application refer to reducing parallax values. That language is frequently used because, at least, offensive parallax values often correspond to a 3D effect in which an object appears closer to the viewer than the screen. Such situations involve a parallax value that is too large for comfort or safety. It should be understood, however, that all of the implementations can be used to increase parallax values if, for example, the parallax is considered to be too small. Frequently, an implementation will provide safety and/or comfort levels for both hyperdivergence and hyperconvergence, as explained below.

Figure 2:
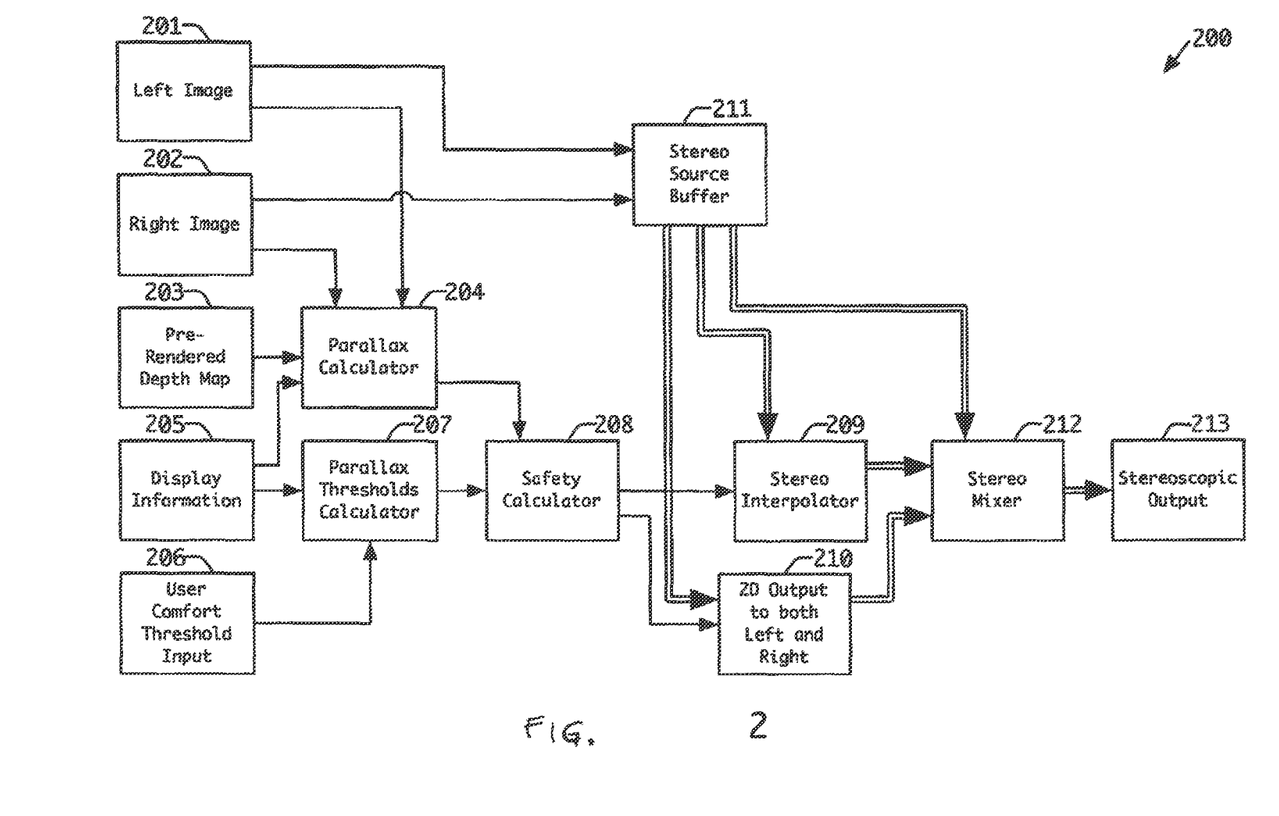
FIG. 2 provides a block diagram depicting an implementation of a system for providing a video sequence.

FIG. 2 shows a system block diagram of a system or apparatus 200 for presenting stereoscopic content and ensuring that the parallax does not exceed safe values.

In FIG. 2, a Parallax Calculator (204) determines the peaking parallax values for both hyperconvergence and hyperdivergence. The calculations are based either on a combination of Left (201) and Right (202) images, or from a Pre-Rendered Depth Map (203). It should be understood that the parallax calculator 204 does, in various implementations, determine minimum and maximum peaking disparity or depth, rather than parallax.

To do this, the parallax calculator (204) determines the maximum parallax angle $\theta_{MAX}$ based on disparity or depth information supplied (as with pre-rendered depth map 203) or by analyzing the disparities between corresponding object images 201, 202. Likewise, the minimum parallax angle $\theta_{MIN}$ is found, too.

In various implementations, a disparity histogram is used to assess maximum and minimum disparity.

Display Information (205), which indicates the size of the display and viewing conditions (e.g., viewing distance, expected viewer interocular distance), is acquired. This can come from manual input, feedback from the display, a preset or any other source like eye tracking. Display information 205 may be used by parallax calculator 204, e.g., in conjunction with EQ. 2 or EQ. 4.

The comfort threshold for viewing (206) is inputted by the user, a factory preset or another mechanism. This may be in terms of minimum and maximum disparities (physical or intrinsic), minimum and maximum apparent object distance (depth), and/or minimum and maximum parallax angle. Alternatively, this could be provided by example, e.g., a viewer might indicate when display of a test image becomes uncomfortable, and the noted threshold might be recorded. The comfort threshold can be set, for example, based on that recorded threshold (for example, disparity value). Examples include (i) setting the comfort threshold to the recorded threshold, (ii) setting the comfort threshold to the "depth" (for example, disparity) value one or two frames before the viewer indicated discomfort, or (iii) setting the comfort threshold to a value slightly "safer" than the recorded threshold, such as, for example, for a disparity value, setting the comfort threshold to 90% of the absolute value of the recorded disparity threshold.

A Parallax Thresholds Calculator (207) takes the input from (205) and (206) and determines the minimum and maximum allowable parallax ($\theta_{MIN\_THRESHOLD}$, $\theta_{MAX\_THRESHOLD}$) for the content. It should be understood that the parallax thresholds calculator 207 does, in various implementations, determine minimum and maximum allowable disparity or depth, rather than parallax. Similarly, the A Safety Calculator (208) combines the threshold values (207) with the actual content peaking values (204) and determines whether action is required or not. In its simplest form, the safety calculator 208 can be a comparator, triggering when $\theta_{MAX} > \theta_{MAX\_THRESHOLD}$, or when $\theta_{MIN} < \theta_{MIN\_THRESHOLD}$.

More complex determinations typically use a processor and can consider duration, e.g., triggering when $\theta_{MAX} > \theta_{MAX\_THRESHOLD}$ for more than a predetermined amount of time, or when the integral over time of the angle by which $\theta_{MAX}$ exceeds $\theta_{MAX\_THRESHOLD}$ exceeds a predetermined value. Such more complex determinations would allow the recognition that a viewer may be tolerant of a transient parallax excursion, but not care for the same extreme value if sustained.

Further implementations also consider the portion of a display that is guilty of the parallax (or disparity or depth) excursion. For example, one or more implementations trigger a violation when a large object has a disparity above a given threshold. The size of the object that qualifies as "large" can be, for example, set by default, set by a user, or set to a certain percentage of the display size.

Yet further implementations also consider the motion of an object in determining if a parallax violation has occurred. Moving objects often have higher parallax values and/or higher rates of change of parallax values. This aspect is captured, in various implementations, by considering both the absolute value of parallax and the rate of change of parallax. Such implementations base the decision of whether a parallax violation has occurred on at least these two factors of absolute value and rate of change. Such implementations will typically include another block (not shown in FIG. 2) to estimate the motion. The output of a motion estimation block, in various implementations, is provided as an input to the safety calculator 208.

When action is required by the safety calculator 208, it can take the form of a stereoscopic interpolation, provided by stereo interpolator (209), to constrain the parallax extremes to the thresholds (207), or a switch to 2D output (210) to prevent viewing excessive content.

The interpolation is, in different implementations, either local or global. Certain implementations perform clipping of the absolute value of disparity at the maximum allowable value, which is a local operation that affects only the objects that violate the threshold. Other implementations interpolate the disparity of only the objects that violate the threshold, which is also a local operation. Other implementations, scale down the disparity of the entire image, which is a global operation affecting the disparity of the entire image (except perhaps objects having zero disparity).

An option of the present disclosure is to provide a Stereo Source Buffer (211) and a Stereo Mixer (212) in order to provide smoother transitions between stereoscopic source content (201, 202; from 211) and either an interpolated stereoscopic output (from 209) or 2D output (from 210). In FIG. 2, double lines indicate stereoscopic signal paths (i.e., the outputs of modules 209-212), whereas non-stereoscopic signal paths (i.e., the outputs of sources 201, 202) are not so indicated.

At the least, stereo source buffer 211 provides enough latency in a real-time signal path that safety calculator 208 is able to direct the necessary action before offending stereoscopic content is presented. For example, the stereo source buffer 211 includes, in various implementations, sufficient memory or buffer length to allow the system 200 (i) to identify a violation of the safety threshold and/or the comfort threshold, (ii) to correct the violation, and (iii) to smooth the transition.

In one embodiment, stereo interpolator 209 obtains stereoscopic images from buffer 211 and computes a new stereoscopic image pair which is then provided to stereo mixer 212, and which stereo mixer 212 uses in preference to the unmodified stereoscopic stream from buffer 211. The new stereoscopic image pair represents the same scene, but presents it with parallax that is less extreme. The degree to which the extremeness of the parallax is reduced may be communicated by safety calculator 208, or in some embodiments may be a predetermined reduction.

In another embodiment, 2D output module 210 accepts stereoscopic content from buffer 211 and, when signaled by safety calculator 208, duplicates the left- or right-eye image of the stereoscopic image pair to replace the other-eye image. 2D output module 210 thus provides as output a 2D image pair, which is an image pair in which both images are the same. In this way, the parallax is completely squelched, resulting in a stereoscopic image that contains no disparity, that is, appears completely 2D. Stereo mixer 212 will use the 2D output 210, when provided, in preference to the unmodified stereoscopic stream from buffer 211.

In still another embodiment, both stereo interpolator 209 and 2D output module 210 may be signaled by safety calculator 208, with stereo mixer 212 gradually fading among the sources 209-211 according to policy.

In other embodiments, modules 209-211 may produce their respective outputs continuously. Further, stereo mixer 212 can be commanded by safety calculator 208 to select among them.

In some embodiments, stereo source buffer 211 may be large enough to permit a gradual transition from the fully stereoscopic content as provided by left and right images 201, 202 to the parallax-limited content (whether interpolated stereoscopic images or 2D presentation).

In one example, the buffer 211 holds ten frames. While the first frame is being shown, the safety calculator 208 determines that the tenth frame exceeds a limit. Then the stereo interpolator 209 is engaged for the second through tenth frames, to gradually introduce over those nine frames the appropriate correction to display the contents of the tenth frame without violating the limits.

In another example, the buffer 211 still holds ten frames. However, the first frame in buffer 211 is flagged by safety calculator 208 as violating the safety or comfort threshold. Accordingly, a commensurate correction is provided (e.g., by stereo interpolator 209). No further frames in buffer 211 require any correction. Accordingly, the correction provided to the first frame is gradually eliminated over the succeeding frames. In such cases, stereo mixer 212 is configured to show images from stereo interpolator 209, when provided, in lieu of the corresponding images from stereo source buffer 211.

In another embodiment, stereo source buffer 211 again holds ten frames, and the 3D effect in the tenth frame is flagged by safety calculator 208 as violating the safety or comfort threshold. As a correction (modification), only 2D output 210 will be provided for the tenth frame. The transition is eased, however, by cross-fading the full stereoscopic images two through nine with the corresponding versions from 2D output 210. The crossfade is produced by mixer 212 by, for example, taking a partial contribution from the stereo source buffer 211 and a conjugate partial contribution from 2D output 210. In one implementation, the partial contribution from the stereo source buffer 211 starts at 90%, and the partial contribution from the 2D output 210 starts at 10%, so that the contributions total 100%. Further, the contribution of the 2D output 210 increases frame by frame, and the contribution of the stereo source buffer 211 decreases in a corresponding manner frame by frame, so that the total is 100% for every frame. The result is that by the tenth frame, the stereoscopic output 213 is 100% 2D output 210.

In such an embodiment, stereo mixer 212 may be configured to automatically begin a fade when images from 2D Output 210 become available. Alternatively, the use and degree of fade may be controlled by a control signal (not shown) from safety calculator 208.

In still another embodiment, stereo mixer 212 provides the signal from stereo source buffer 211. Frame ten is flagged by safety calculator 208 as violating a safety or comfort threshold. Accordingly, stereo mixer 212 begins a fade to black over several frames, such as, for example, frames two through five. Stereo mixer 212 then switches to 2D output 210 as the source, but fades from black over frames six through nine. Frame ten is then shown following the fade-in, but in 2D only.

These various techniques for easing the transition to and from a modified stereoscopic presentation have different aesthetic effects. Accordingly, the techniques may be selected or adjusted based on viewer preferences, a viewer profile, etc.

The resulting combination of original stereoscopic source (201, 202; from 211), interpolated stereoscopic images (from 209), and/or 2D content (from 210) is then sent to the stereoscopic output (213) for viewing.

In a simple embodiment, safety calculator 208 can simply command 2D output module 210 to duplicate one of the left- and right-eye images into the other eye and provide that as stereoscopic output 213.

Another option of the present disclosure is to have the process applied to the entirety of the stereoscopic content prior to viewing in order to provide higher quality interpolation, smoother transitions, or both.

Figure 3:
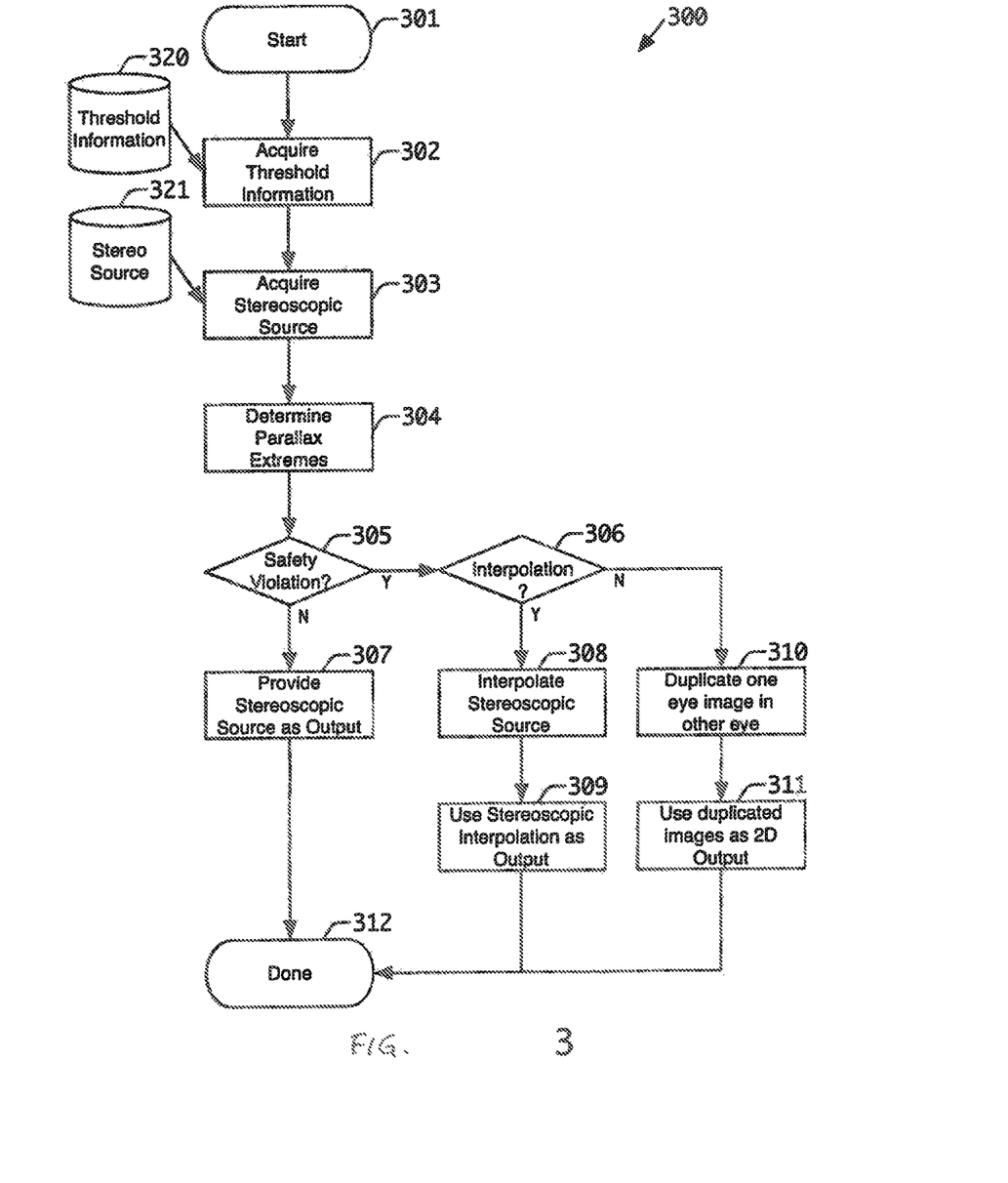
FIG. 3 provides a flow diagram depicting an implementation of a process for providing a video sequence.

FIG. 3 shows process 300 for preventing excessive parallax viewing, which starts at 301 with display information 205 and user comfort threshold input 206 having been provided to threshold calculator 207, with the resulting thresholds and corresponding policy information 320 stored. Left- and right-eye images 201, 202 are available, in sequence as stereoscopic source 321. Stereoscopic source 321 may further comprise depth map 203, if supplied.

At step 302, the threshold information 320 is acquired. At step 303, stereo source (i.e., left image 201, right image 202) is acquired for processing. At step 304, the parallax extremes are determined by parallax calculator 204 from stereoscopic source 321.

At step 305, safety calculator 208 determines whether the parallax extremes obtained at 204 are within the limits of the threshold information 320. If so, that is, if there is no safety violation, then at step 307 the images from the stereoscopic source are provided as output to be viewed. Otherwise, at step 306 a determination is made, also by safety calculator 208, as to whether the excessive parallax will be mitigated using stereoscopic interpolation or by forcing the output to be 2D.

An example of determination 306 may be that for a slight violation of the parallax extremes in threshold information 320, stereoscopic interpolation is used, whereas for a more severe violation of the parallax extremes, 2D output is to be used. What constitutes slight vs. severe violations of the parallax extremes would be provided in threshold information 320 as a matter of policy.

Various implementations use many different policy decisions in the process of determining whether to use interpolated stereoscopic output or a 2D output. Examples of policy decisions that are used in various implementations include one or more of the following: (i) if the parallax exceeds the comfort level by more than a threshold, then switch to 2D rather than interpolate, (ii) if objects exceed the comfort level on both the positive parallax and the negative parallax, then switch to 2D rather than interpolate, and/or (iii) if the parallax is above the comfort level and a high level of motion is detected, then switch to 2D rather than interpolate.

The rationale for switching to 2D can be different for different implementations. Certain implementations switch to 2D for quality reasons, speed reasons, and/or complexity reasons. For example, when the parallax is excessive, the interpolation required to bring the parallax within the comfort level is frequently time consuming (speed reason) or requires considerable processing power and/or memory (complexity reasons). Further, such interpolation can degrade the quality of the images due to occlusions (quality reason).

If, at step 306, the determination is to use stereoscopic interpolation, then process 300 continues at step 308 where stereoscopic interpolator 209 processes the stereoscopic source (images 301, 302) to produce a stereoscopic interpolation that is output for viewing in step 309.

Otherwise, a stereoscopic image pair having no disparity is produced by 2D output module 210, for example by copying a first eye image of the stereoscopic source (images 301, 302) into the other eye image, effectively creating a 2D image, but in a stereoscopic format. At step 310, the 2D image in stereoscopic format is output for viewing.

Steps 304-311 may be repeated (not shown in FIG. 3) for each stereoscopic image pair in stereo source 321. After the last stereoscopic image pair, or their interpolated or 2D replacements have been output by steps 307, 308, or 309, process 300 concludes at 312.

In some embodiments of process 300, only one of the remedies for excessive parallax (interpolation vs. 2D output) might be provided, in which case, step 306 will be absent and the sole provided remedy used (either steps 308/309 or 310/311).

The operations 307, 309, and 311 are performed by, for example, the stereo mixer 212. The stereo mixer 212 also performs, in various implementations, a smoothing operation that is not shown in FIG. 3 (see, however, FIGS. 4-5). Smoothing is used, in this application, to refer, for example, to modifying a transition in depth (or in a depth indicator) so that the transition is not as large. This is frequently discussed as a filtering operation.

The smoothing operation can be applied to, for example, the parallax, the depth, or the disparity. This smoothing is performed, in various implementations, in a spatial domain and/or a temporal domain.

We address the temporal domain first. In various scenarios, the stereo mixer 212 determines that smoothing is to be provided between (i) a transition from 3D (original or interpolated) to 2D, (ii) a transition from 2D to 3D (original or interpolated), (iii) a transition from original 3D to modified 3D, and/or (iv) a transition from modified 3D to original 3D. Note that the modified 3D typically reflects, in various implementations, a modification that either lowered a depth indicator or increased a depth indicator for the associated portion of an image pair.

Smoothing operations can take one or more of several forms. The following implementations illustrate a variety of smoothing operations:

If the stereo mixer 212 transitions from 3D (original 3D or modified 3D) to 2D, the stereo mixer 212 smoothes the transition by gradually softening the parallax, using, for example, the stereo interpolator 209, until 2D is reached, or until a threshold is reached. Various implementations soften the parallax gradually using a linear reduction in successive images of a video sequence, using a parabolic reduction, or using an exponential reduction. These techniques avoid an abrupt change in the parallax because such an abrupt change can frequently cause viewing discomfort or at least contribute to a perception of poor quality. The smoothing continues, in these implementations, until, for example, (i) 2D is reached, (ii) the parallax is reduced to within a threshold of 2D, in which case the smoothing then switches to 2D, or (iii) the parallax returns to a comfortable level, in which case the stereo mixer 212 then switches to original 3D (possibly performing smoothing for that transition as well, as discussed below). The smoothing is applied to the parallax (or depth or disparity, for example) of a particular object across multiple images.

One particular implementation uses the stereo interpolator 209 to reduce the absolute value of the disparity by 50% (either globally or locally) in each of several successive image pairs. These reductions continue until the absolute value of the disparity is within a threshold of zero, at which time the stereo mixer 212 switches to 2D. Other implementations reduce the effects of parallax by linear reductions in the absolute value of the disparity over each of several successive image pairs. These reductions also continue until the absolute value of the disparity is within a threshold of zero, at which time the stereo mixer 212 switches to 2D. These are examples of temporal smoothing that occur over several successive image pairs. These are also referred to as iterative smoothing processes, or gradual smoothing processes.

If the stereo mixer 212 transitions from 2D to 3D (original 3D or modified 3D), the stereo mixer 212 smoothes the transition by gradually increasing the parallax until the desired parallax is reached. Various implementations increase the parallax gradually using a linear increase, a parabolic increase, or an exponential increase. These techniques avoid an abrupt change in the parallax, as explained above, because such an abrupt change can frequently cause viewing discomfort or at least contribute to a perception of poor quality. The smoothing continues, in these implementations, until (i) the desired 3D is reached, (ii) the parallax is increased to within a threshold of the desired 3D, in which case the smoothing then switches to the desired 3D, or (iii) the parallax again jumps sufficiently that the stereo mixer 212 determines to provide 2D (possibly performing smoothing for that transition as well, as discussed above).

One particular implementation uses the stereo interpolator 209 to increase the absolute value of the disparity (either globally or locally) by up to 50% in each of several successive image pairs. These increases continue until the disparity is within a threshold of the maximum absolute values of disparity, at which time the stereo mixer 212 switches to 3D. Another implementation uses the stereo interpolator 209 to increase the effects of parallax by linear restorations (increases) in the absolute value of the disparity over each of several successive image pairs. These increases continue until the disparity is within a threshold of the full values in the original stereoscopic images, at which time the stereo mixer 212 switches to 3D. These are examples of temporal smoothing that occur over several successive image pairs. These examples are also referred to as iterative smoothing processes, or gradual smoothing processes.

Various implementations transition between 3D values. This includes, for example, transitioning from (i) original 3D to modified 3D, (ii) modified 3D to original 3D, and/or (iii) modified 3D to a different modified 3D. The starting 3D value can be within the safety/comfort level or not. These implementations modify the disparity to achieve a modified 3D. The modified 3D also can be within the safety/comfort level, or not. For example, certain implementations gradually smooth an excessive disparity (which is outside of the safety/comfort level), but smooth gradually, with the result that at least some of the modified 3D values are still outside of the safety/comfort level. One such implementation gradually steps down the absolute value of the disparity, but that stepped down value does not fall below the safety/comfort level until after several steps.

It should be clear that, for a given stereoscopic image pair, different objects within a stereoscopic image pair will have different disparity values. Accordingly, in many smoothing processes, the smoothing operations are only being performed on a subset of the objects in the images. For example, after an initial reduction of absolute values of disparity for an entire image pair, many objects will be within a threshold of 2D, or a threshold corresponding to a reduced 3D. Consequently, subsequent reductions in absolute value of disparity, as the smoothing operation continues, will only be performed on those objects still having an absolute value of disparity above the threshold. Note that various implementations apply first a global reduction (for example, 50%), and then locally reduce the absolute value of disparity for objects which are still above the threshold after this 50% reduction.

The smoothing operation extends temporally across a number of stereoscopic image pairs of a video sequence. Various implementations use more, or less, time or image pairs to perform smoothing operations. The speed with which the smoothing is performed, in terms of time or numbers of image pairs, can be determined, for example, by user preferences.

Various implementations access an adjustment level as an input, provided, for example, by a user, a user profile, or a default value. The adjustment level, in this context, is used to determine how strongly to modify a given image (or a portion of an image). For example, in various implementations, the adjustment level can be anywhere between 0 and 1, where zero means no disparity (=2D) and 1 is full (original) 3D. Zero corresponds to the strongest, in some sense, modification, and one corresponds to the weakest (that is, to zero) modification. In between zero and one, the modification (for example, interpolation) reduces the level of disparity. Again it can be used in a temporal way to smoothly go from 3D (original or modified) to 2D (and the opposite). It can also be used from 3D (original or modified) to another 3D (original or modified). An adjustment level can also be applied to spatial smoothing, to dictate the level of modification spatially. Further, an adjustment level can also be applied to increasing the absolute value of disparity, such as, for example, with a zero indicating no change and a one indicating a maximum change.

It should be clear that the gradient can be used in a variety of implementations to guide the temporal smoothing process. The gradient is determined, for example, as the rate of change of an object's parallax (or depth, or disparity, for example) from image to image. Certain implementations also define the safety/comfort level based, in part at least, on the rate of change of parallax (for example). Various implementations temporally smooth an object's parallax (for example), sufficiently to bring the parallax down to an absolute level that is within a safety/comfort zone, and/or down to a level such that the rate of change of the parallax from the previous image to the current image is within a safety/comfort zone.

We now address spatial smoothing, that is, smoothing in the spatial domain. In various scenarios, the stereo mixer 212 determines that smoothing is to be provided within a given image because, for example, a local parallax (for example) modification was made. Due to the local modification, there may be a depth transition for a portion of the image that is uncomfortable for a viewer. The depth transition is often referred to as a depth transition for an object.

Spatial smoothing operations can take one or more of several forms. The following implementations illustrate a variety of smoothing operations:

Various implementations determine that local/spatial smoothing is to be applied if the depth transition of the object exceeds a threshold. This may occur, for example, if the parallax of the object was modified, but the parallax of the area surrounding the object was not modified.

Various implementations determine an interpolation zone defined as a region extending from the object for a defined number of pixels. Such a zone may resemble a donut, if it surrounds an object in the middle of the image. Such a zone may have a different shape, however, if, for example, the object abuts an edge of the image.

Various implementations adjust the parallax (for example) of the pixels in the interpolation zone gradually, moving from the parallax value of the object to the parallax value of the pixels adjacent the outside of the interpolation zone. The interpolation can be, in various implementations, linear, parabolic, or exponential.

Various implementations use an interpolation zone, mentioned above, to avoid an abrupt change in parallax between, for example, an object and a region adjacent the object. The size (width, in terms of pixels, typically) of the interpolation zone is determined based on, for example, the existing gradient (that is, the actual difference without smoothing) in parallax (for example), the desired gradient in parallax, and the size of the display. In one implementation, an object is near the middle of an image, and due to a modification of the parallax, there is an abrupt change in parallax from the object to the area surrounding the object. To smooth that depth transition for the object, a donut-shaped interpolation zone having a width of ten pixels is defined in the area immediately surrounding the object, and the parallax is gradually sloped from the parallax value of the object to the parallax value of the area adjacent the outside of the interpolation zone.

Various implementations perform a linear slope within an interpolation zone, between a parallax value of an object on the "interior" edge of the interpolation zone and a parallax value of the area adjacent the "exterior" edge of the interpolation zone.

In many implementations, the interpolation zone will surround an object that has a parallax (for example) that has already been modified. Additionally, the outer edge of the interpolation zone will be adjacent to an area that has not been modified. Both edges will, in certain implementations, be within the safety/comfort level, however. Depending on the severity of the modification that was performed on the object's parallax, there can be a variety of noticeable effects at the depth transition that will cause discomfort to a viewer and/or reduce perceived quality of the image.

Various implementations define an adjustment level, between, for example, zero and some positive integer. The adjustment level can be set, for example, to a value between zero (indicating that no adjustment is to be made) and five (indicating that a maximum adjustment is to be made). In certain implementations, the adjustment level is combined with an interpolation zone, and the parallax (or depth or disparity) is adjusted from the level of the object toward the level of the area surrounding the interpolation zone. If the level is five, then the parallax (for example) is adjusted completely between the two values bordering the interpolation zone. If, however, the level is between zero and five, then the parallax (for example) is only partially adjusted from the value of the object toward the value of the area surrounding the interpolation zone. Accordingly, there is still a transition, but the transition is not as large as it would otherwise have been.

It should also be clear that smoothing is a form of interpolation, and typically uses interpolation to effect the parallax changes within the interpolation zone. Accordingly, in various implementations of FIG. 2, the stereo mixer 212 instructs the stereo interpolator 209 to perform the desired smoothing. In such systems, the 2D output is also routed from the unit 210 to the stereo interpolator 209.

Certain systems do not perform interpolation. Rather, certain implementations provide either original 3D or, if a comfort level is exceeded, 2D. Some of these implementations also provide smoothing between the transitions from 3D to 2D, and from 2D to 3D.

Figure 4:
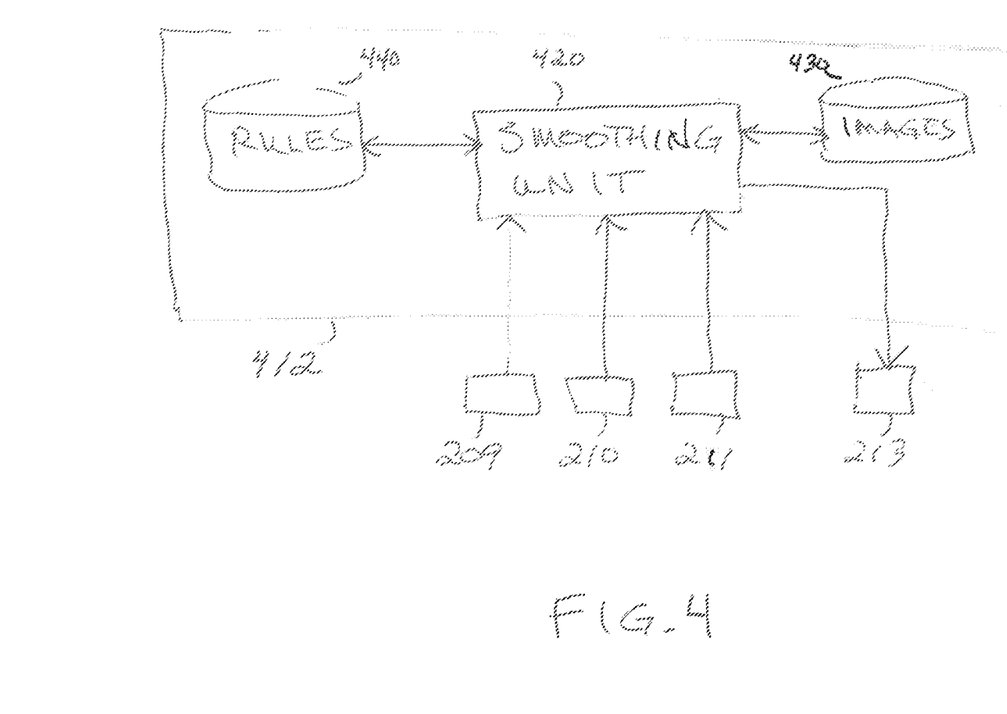
FIG. 4 provides a block diagram depicting an implementation of a system for smoothing video content.

Referring to FIG. 4, an implementation of a stereo mixer is provided that is able to perform smoothing. FIG. 4 includes a stereo mixer 412, which is an implementation of the stereo mixer 212 from FIG. 2.

The stereo mixer 412 includes a smoothing unit 420. The smoothing unit 420 includes, in various implementations, a filter or a processor for performing smoothing operations and algorithms.

The smoothing unit 420 is coupled to an images storage unit 430 for storing images. The images stored in the images storage unit 430 include, for example, images in a stereoscopic image sequence that have been processed by the system 200 of FIG. 2. The images stored in the images storage unit 430 can be images that occur previous in time to the current image(s) being processed. Additionally, or alternatively, the images stored in the images storage unit 430 can be later in time to the current image(s) being processed. In particular, certain implementations that operate iteratively can access images that occur previous in time or later in time to the current image(s) being processed.

The smoothing unit 420 is also coupled to a rules storage unit 440. The rules storage unit 440 stores rules, and a rule can include any parameter used in a smoothing process performed by the smoothing unit 420. Such parameters include, for example, parameters related to temporal smoothing, parameters related to spatial smoothing, parameters identifying a smoothing zone, parameters identifying a filter or providing filter parameters. Various of these parameters are further discussed below.

The smoothing unit 420 is also coupled to the stereo interpolator 209, the 2D output module 210, and the stereo source buffer 211 described in the discussion of FIG. 2. The smoothing unit 420 interacts with the stereo interpolator 209, the 2D output module 210, and the stereo source buffer 211, in a similar manner discussed for the stereo mixer 212 of FIG. 2.

The smoothing unit 420 is also coupled to the stereoscopic output 213. The smoothing unit 420 interacts with the stereoscopic output 213, in a similar manner discussed for the stereo mixer 212 of FIG. 2.

The smoothing unit 420 is operable to perform a variety of smoothing operations. Various of these smoothing operations are described below with respect to FIG. 5 and the additional implementations of related to FIG. 5.

Referring to FIG. 5, a process 500 is provided for smoothing a depth transition. It is understood that a depth transition also refers to and includes a disparity transition. A depth transition can occur, for example, as a spatial transition within a picture, or as a temporal transition across multiple pictures.

An example of a spatial depth transition includes a transition from an area of, for example, high disparity to a separate area in the same image that has low disparity. A spatial depth transition is, in different circumstances, a gradual transition, or an abrupt transition.

An example of a temporal depth transition includes a transition from a first image in a sequence to a subsequent image in the sequence. There are frequently multiple depth transitions that occur in the transition from a first image to a subsequent image. Depth transitions are typically tracked for a specific object that occurs in both the first image and the subsequent image. Thus, for a given object that occurs in both the first image and the subsequent image, the object will have a respective depth in each of the first image and the subsequent image. The temporal depth transition for the object refers to the change in depth for the object from the first image to the subsequent image. The temporal depth transition can be, for example, flat if the depth for the object is the same in both the first image and the subsequent image, gradual if the depth changes by a small amount from the first image to the subsequent image, or abrupt if the depth change by a substantial amount from the first image to the subsequent image.

The process 500 includes determining that a depth indicator for an object is outside of a range (510). In particular implementations of the process 500, the operation 510 includes determining that a depth indicator for an object in a stereoscopic image pair of a video sequence is outside of a target range.

A depth indicator is an indicator of depth, or of disparity or parallax. Examples of a depth indicator include a value of depth or disparity or parallax, or a range of depth or disparity or parallax. A value or a range is indicated, in various implementations, by a number or range of numbers, by a color or range of colors, by a size or range of sizes (such as, for example, by bars in a histogram).

The operation 510 is performed, for example, by the operation 305 that determines that a parallax extreme has been violated. The operation 510 is performed, for example, by the safety calculator 208.

The process 500 includes modifying one or more images so that the depth indicator is within the range (520). In particular implementations of the process 500, the operation 520 includes modifying one or more images of a stereoscopic image pair so that the depth indicator for an object is within a target range.

The operation 520 is performed, for example, by the operation 308 that interpolates a stereoscopic source, or by the operation 310 that duplicates one eye image in the other eye. The operation 520 is performed, for example, by the stereo interpolator 209 of FIG. 2 (performing, for example, the operation 308) or by the 2D output 210 of FIG. 2 (performing, for example, the operation 310). The operation 308 modifies the image by interpolating. The operation 310 modifies the image by replacing the image with a 2D version, that is, by replacing one image of a stereoscopic image pair with a copy of the other image of the stereoscopic image pair.

The process 500 includes an optional step of smoothing a depth transition for the object (530). In particular implementations of the process 500, the operation 530 includes smoothing a depth transition between the object and another portion of the video sequence. The operation 530 is performed, for example, by the stereo mixer 212 and/or the stereo mixer 412.

A variety of examples of implementations of the process 500 will now be described. These examples are illustrative and not intended to be exhaustive.

Various implementations perform the modifying operation 520 by, at least in part, replacing the stereoscopic image pair with a 2D image pair. For particular implementations at least, the replacement results in a video sequence that includes (i) one or more stereoscopic image pairs having non-zero disparity and for which the depth indicator is within the target range for the entire image pair, and (ii) one or more 2D image pairs.

Various implementations determine that the depth indicator is outside of the target range by more than a threshold. Several of these implementations then determine, based on the determination that the threshold is exceeded, to replace the stereoscopic image pair with the 2D image pair.

Various implementations smooth a modified 3D image pair. A 3D image pair is a stereoscopic image pair. One or more images of the stereoscopic image pair are modified so that a depth indicator for an object is between zero and a value of the depth indicator for a corresponding object in a previous stereoscopic image pair.

Various implementations smooth a 2D image pair. A 2D image pair is an image pair in which both images are the same, thus producing no 3D effect. One or more images of the stereoscopic image pair are modified by replacing the stereoscopic image pair with a 2D image pair that includes the object.

Various implementations smooth spatially. For example, certain implementations smooth a depth transition between the object in the stereoscopic image pair, and a region in the stereoscopic image pair. In some implementations, the region is adjacent the object.

Various implementations smooth temporally (or both spatially and temporally). For example, certain implementations smooth a depth transition between the object in the stereoscopic image pair, and a corresponding object in a separate image pair of the video sequence. In various implementations, the separate image pair occurs prior to the stereoscopic image pair in the video sequence, and/or after the stereoscopic image pair in the video sequence. In various implementations, the smoothing is performed in the stereoscopic image pair, and/or in the separate image pair. Further, the separate image pair is, in particular implementations, a stereoscopic image pair, and/or a 2D image pair.

Various implementations perform one or more smoothing techniques, either spatially, temporally, or both spatially and temporally. In certain implementations, the smoothing is performed until a gradient of the depth indicator is within a target gradient range. Certain implementations determine a smoothing zone in which the smoothing is performed. In certain implementations, the smoothing zone includes a spatial smoothing zone within the stereoscopic image pair, and the spatial smoothing zone includes, for example, a specified width of pixels around the object. In certain implementations, the spatial smoothing zone is determined with respect to one of the images of the stereoscopic image pair. In certain implementations, the smoothing zone comprises a temporal smoothing zone and includes one or more stereoscopic image pairs in the video sequence for which the depth indicator of the object is smoothed with respect to a corresponding object in the one or more stereoscopic image pairs. In certain implementations, the depth indicator is varied linearly throughout the smoothing zone.

Various implementations determine that the depth indicator for the object is outside of the target range by, at least in part, determining that the depth indicator has exceeded a threshold for at least a predetermined amount of time.

Various implementations perform switching by using, at least in part, cross-fades, fade-ins, fade-outs, fades-to-black, and fades-from-black. In one example, a scene change involves a large depth transition, and a fade-to-black at the end of the first scene, followed by a fade-in at the beginning of the new scene, are performed to avoid the large depth transition.

In various implementations, the stereo mixer 212 switches between different inputs, including 2D, original 3D, and modified 3D. Such stereo mixers are commonly implemented with a stereo switcher. Typical stereo switchers are also capable of performing the cross-fades, fade-ins, fade-outs, fade-to-blacks, and fade-from-blacks, discussed above.

Smoothing is facilitated in many implementations by using, for example, a large buffer in the stereo mixer 212. A large buffer provides time for the stereo mixer 212 to identify a depth violation in a particular image, to address that depth violation in the particular image, and to perform smoothing. The smoothing is performed, in different implementations, on the images preceding the particular image, on the images succeeding the particular image, and/or on the particular image.

Various implementations modify stereoscopic image pairs, when a safety or comfort threshold is violated for a pair, by replacing the offending stereoscopic image pairs with corresponding 2D image pairs. Several such implementations can produce a video sequence that includes (i) one or more stereoscopic image pairs having non-zero disparity and for which a depth indicator does not violate a safety or comfort threshold for the entire image pair, and (ii) one or more 2D image pairs. Such implementations can provide a useful approach to complying with a requirement to avoid excessive 3D. Several such implementations further provide optional smoothing features.

In various implementations, the video sequence that is modified and/or smoothed is provided for one or more of (i) storage, (ii) transmission, or (iii) presentation. For example, the stereoscopic output 213 can be presented on any of a variety of display devices. Such display devices include, for example, a television, a computer display, a tablet, or a cell phone.

It should be understood that the elements shown in FIGS. 2-5 may be implemented in various forms of hardware, software, or combinations thereof. Typically, these elements are implemented in a combination of hardware and software on one or more appropriately programmed general-purpose devices, which may include a processor, memory, and input/output interfaces. Herein, the phrase "coupled" is defined to mean directly connected to or indirectly connected through one or more intermediate components. Such intermediate components may include both hardware and software based components.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in FIGS. 2-5 may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. Having described preferred embodiments, it is noted that modifications and variations can be made by persons skilled in the art in light of the above teachings. It is therefore to be understood that changes may be made in the particular embodiments of the disclosure which are within the scope of the disclosure.

This application provides multiple figures, including the block diagrams of FIGS. 2 and 4, and the flow diagrams of FIGS. 3 and 5. Each of these figures provides disclosure for a variety of implementations.

For example, the block diagrams certainly describe an interconnection of functional blocks of an apparatus or system. However, it should also be clear that the block diagrams provide a description of a process flow. As an example, FIG. 2 also presents a flow diagram for performing the functions of the blocks of FIG. 2. For example, the block for the safety calculator 208 also represents the operation of determining whether the parallax of a stereoscopic image pair exceeds a safety parallax threshold, and the block for the stereo interpolator 209 also represents the operation of modifying the depth of a stereoscopic image pair. Other blocks of FIG. 2 are similarly interpreted in describing this flow process.

Further, FIG. 4 can also be interpreted in a similar fashion to describe a flow process.

For example, the flow diagrams certainly describe a flow process. However, it should also be clear that the flow diagrams provide an interconnection between functional blocks of a system or apparatus for performing the flow process. As an example, FIG. 3 also presents a block diagram for performing the functions of the process 300. For example, reference element 304 also represents a block for performing the function of determining parallax extremes. Other blocks of FIG. 3 are similarly interpreted in describing this system/apparatus. Further, FIG. 5 can also be interpreted in a similar fashion to describe a system or apparatus.

We have thus provided a number of implementations. Various implementations attempt to prevent excessive parallax, depth, or disparity from being presented to a viewer. Various implementations (i) interpolate 3D content, (ii) replace 3D content with 2D content, and/or (iii) smooth content. The content that is smoothed can be 2D or 3D content, and various techniques are discussed for performing the smoothing operations.

It should be noted, however, that variations of the described implementations, as well as additional applications, are contemplated and are considered to be within our disclosure. Additionally, features and aspects of described implementations may be adapted for other implementations.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in a processor, such as, for example, a post-processor or a pre-processor. The processing devices discussed in this application do, in various implementations, include multiple processors (sub-processors) that are collectively configured to perform, for example, a process, a function, or an operation. For example, the smoothing unit 420, is, in various implementations, composed of multiple sub-processors that are collectively configured to perform the operations of the smoothing unit 420.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants ("PDAs"), and other devices that facilitate communication of information between end-users.

Implementations of the various processes and features described herein may be embodied in a variety of different equipment or applications. Examples of such equipment include an encoder, a decoder, a post-processor, a pre-processor, a video coder, a video decoder, a video codec, a web server, a television, a set-top box, a router, a gateway, a modem, a laptop, a personal computer, a tablet, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the code for performing a smoothing operation, or to carry as data the actual smoothed stereoscopic video sequence generated by performing the smoothing operation. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    determining that a depth indicator for an object in a stereoscopic image pair of a video sequence is outside of a target range;
    modifying one or more images of the stereoscopic image pair so that the depth indicator for the object is within the target range; and
    smoothing a depth transition between the object and another portion of the video sequence, wherein the smoothing is performed until a gradient of the depth indicator is within a target gradient range.

2. The method of claim 1 wherein modifying one or more images of the stereoscopic image pair comprises modifying so that the depth indicator for the object is between zero and a value of the depth indicator for a corresponding object in a previous stereoscopic image pair.

3. The method of claim 1 wherein modifying one or more images of the stereoscopic image pair comprises replacing the stereoscopic image pair with a 2D image pair that includes the object.

4. The method of claim 3 wherein replacing the stereoscopic image pair with the 2D image pair results in a video sequence that includes (i) one or more stereoscopic image pairs having non-zero disparity and for which the depth indicator is within the target range for the entire image pair, and (ii) one or more 2D image pairs.

5. The method of claim 3 further comprising:
    determining that the depth indicator is outside of the target range by more than a threshold; and
    determining, based on the determination that the threshold is exceeded, to replace the stereoscopic image pair with the 2D image pair.

6. The method of claim 1 wherein smoothing comprises smoothing a depth transition between the object and a region in the stereoscopic image pair.

7. The method of claim 6 wherein the region is adjacent the object.

8. The method of claim 1 wherein smoothing comprises smoothing a depth transition between the object and a corresponding object in a separate image pair of the video sequence.

9. The method of claim 8 wherein the separate image pair occurs prior to the stereoscopic image pair in the video sequence.

10. The method of claim 8 wherein the separate image pair occurs after the stereoscopic image pair in the video sequence.

11. The method of claim 8 wherein the smoothing is performed in the stereoscopic image pair.

12. The method of claim 8 wherein the smoothing is performed in the separate image pair.

13. The method of claim 8 wherein the separate image pair comprises a stereoscopic image pair.

14. The method of claim 8 wherein the separate image pair comprises a 2D image pair.

15. The method of claim 1 wherein smoothing comprises determining a smoothing zone in which the smoothing is performed.

16. The method of claim 15 wherein the smoothing zone comprises a spatial smoothing zone within the stereoscopic image pair and includes a specified width of pixels around the object.

17. The method of claim 16 wherein the spatial smoothing zone is determined with respect to one of the images of the stereoscopic image pair.

18. The method of claim 15 wherein the smoothing zone comprises a temporal smoothing zone and includes one or more stereoscopic image pairs in the video sequence for which the depth indicator of the object is smoothed with respect to a corresponding object in the one or more stereoscopic image pairs.

19. The method of claim 15 wherein smoothing comprises varying the depth indicator linearly throughout the smoothing zone.

20. The method of claim 1 wherein determining that the depth indicator for the object is outside of the target range comprises determining that the depth indicator has exceeded a threshold for at least a predetermined amount of time.

21. An apparatus comprising one or more processors collectively configured for performing:
   determining that a depth indicator for an object in a stereoscopic image pair of a video sequence is outside of a target range;
   modifying one or more images of the stereoscopic image pair so that the depth indicator for the object is within the target range; and
   smoothing a depth transition between the object and another portion of the video sequence, wherein the smoothing is performed until a gradient of the depth indicator is within a target gradient range.

22. An apparatus comprising:
   means for determining that a depth indicator for an object in a stereoscopic image pair of a video sequence is outside of a target range;
   means for modifying one or more images of the stereoscopic image pair so that the depth indicator for the object is within the target range; and
   smoothing a depth transition between the object and another portion of the video sequence, wherein the smoothing is performed until a gradient of the depth indicator is within a target gradient range.

* * * * *